UNITED STATES PATENT OFFICE.

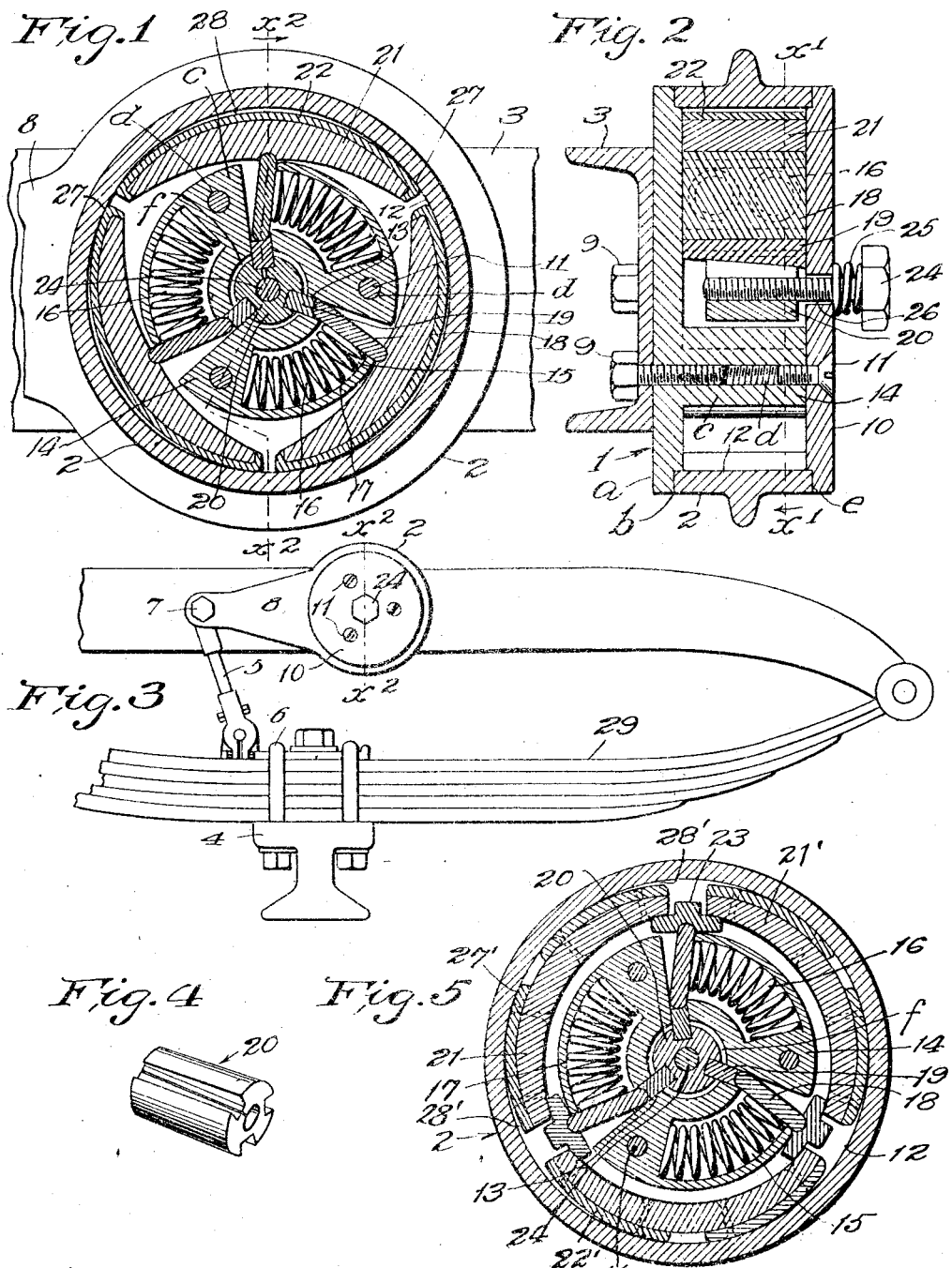

GEORGE CUSHING MARTIN, OF LOS ANGELES, CALIFORNIA.

SHOCK-ABSORBER.

1,039,305.  Specification of Letters Patent.  Patented Sept. 24, 1912.

Application filed September 11, 1911. Serial No. 648,799.

*To all whom it may concern:*

Be it known that I, GEORGE CUSHING MARTIN, a citizen of the United States, residing at Los Angeles, in the county of Los Angeles and State of California, have invented new and useful Improvements in Shock-Absorbers, of which the following is a specification.

This invention is an improvement upon the shock absorber set forth in Letters-Patent of the United States No. 993,536 granted to me May 30, 1911, and in which a shoe is caused to engage a circular wall to prevent relative rotation between two bodies in one direction and to allow free rotation of said bodies in the other direction, the purpose being to yieldingly resist the recoil of a spring which is otherwise left free.

Objects of this invention are, to increase the effectiveness of the device and to simplify and improve the construction and the adjustability of the device.

The invention may be applied in various forms and ways.

The accompanying drawings illustrate the invention in two of the forms in which it may be embodied.

Figure 1 is a sectional view on line $x^1$, Fig. 2, of a shock absorber constructed in accordance with this invention. Fig. 2 is a sectional view of said shock absorber on irregular line $x^2$—$x^2$, shown in Fig. 1 and partly indicated in Fig. 3. Fig. 3 is a side elevation of the shock absorber applied for use. Fig. 4 is a perspective view of the floating adjusting block detached. Fig. 5 is a view analogous to Fig. 1 illustrating the invention in another form.

The relatively rotatable elements 1 and 2 are adapted for attachment to two relatively movable parts of a vehicle as the chassis 3 and axle 4 through any practical means as the connecting rod 5 and the clip 6; said rod 5 being pivoted by the bolt 7 to the arm 8 which is an extension from the element 2. Said element 1 comprises a plate $a$ provided on one side with an annular seat $b$ and a recessed radially slotted body $c$, and is also provided with threaded holes $d$ whereby it is adapted to be fastened to the chassis 3 by bolts 9. The face plate 10 is fastened by screws 11 in said holes $d$ to the body $c$ and is provided with an annular seat $e$. The plate 10 practically forms a part of element 1. The element 2 has a circular ring wall forming an annular frictional surface 12 and fitting with an oil tight joint in the seats $b$ and $e$ between the plates $a$ and 10 of the element 1. The bolts 9 and screws 11 may be screwed into opposite ends of the same threaded holes $d$ which extend through the element 1. The body $c$ of element 1 is separated by the slots 13 into an odd number of radially recessed arms 14 having chambers 15 closed at one end and open at the other end. Springs 16 are seated in said chambers. The inner portions of the radial slots 13 have parallel walls and the outer walls 17 of the chambers are of reduced length, so that the outer portions of the slots are outwardly expanded to allow a swinging motion of the toggle-joint members 18, the inner ends of which rest pivotally in seats formed by the intermediate wedges 19 that are sustained against inner thrust by the grooved adjusting block 20 in which the wedges fit. Said toggle-joint members 18 are of an odd number corresponding to the number of arms, and such helical spring 16 pressing out of its chamber tends to force the toggle members 18 toward the closed face of the adjacent arm.

Shoes are interposed between the annular frictional surface 12 and the outer ends of the toggle members 18, there being as many shoes as there are toggle members 18; and the shoes being adapted when in place inside the friction surface 12 to normally hold the toggle members 18 deflected from radial position to compress the springs 16. The outer walls of the chambers 15 form stops to hold the spring in place and to keep the toggle members and their wedges from swinging too far. The spring-pressed toggles thus supported serve as operative means to force the shoes into frictional contact with the circular wall upon relative rotation between their elements in one direction. The shoes 21, 21' are of resilient material and have external faces that do not conform to the frictional surface 12. Said external faces may be formed of the material of the shoe itself, but are preferably formed of softer material as fiber or aluminum, and are indicated at 22 in Fig. 1 and at 22' in Fig. 5. The toggle members 18 act upon the shoes opposite the points where the external faces are farthest from the frictional surface 12, so that when pressure is applied to the shoes through the operation of the toggle, other points of the shoes will first contact with the frictional face 12 and further operation of the toggle joints will tend to spring the shoes toward conformity with the frictional surface.

In the form shown in Fig. 1 the exterior face of the shoe is of greater radius than the frictional surface 12 of the ring and the toggle member is applied to the shoe at the inner side and midway between the ends, so that the ends of the shoe contact with the frictional surface 12 while the middle of the shoe is farthest separated from such surface. When pressure is applied through the toggle the tendency will be to spring the shoe to a smaller radius so as to conform with the frictional surface 12.

In the form shown in Fig. 5 the exterior face of each shoe is of less radius than the frictional surface 12 and the toggle joint members are supplemented by seats 23 extending between and contacting with the shoes at the points farthest from the frictional surface 12, so that when pressure is applied through the toggle-joint the tendency will be to spring the shoe to a larger radius and toward or into conformity with the frictional surface 12. The floating means to force the shoes into conformity with the wall in each of the instances shown, is practically arranged between the shoes; that is to say, they are inside the circle formed by the shoes and act outwardly upon the shoes to force them into contact with the ring. The adjusting block 20 corresponds in a general way with the adjusting block shown in my cited patent and is adjusted along the intermediate wedges 19 by a spring-pressed adjusting bolt 24, the spring 25 for which constantly tends to force the adjusting block to wedging position so as to maintain an equal adjustment and take up the wear. That is to say, by tightening the bolt 24, the spring 25 is put under a required tension and the force holds the adjusting block, and consequently the toggle members in appropriate operative position. The adjusting bolt 24 passes through a hole 26 of larger diameter than the bolt and the spring rests on the plate 10 around said hole; consequently, the adjusting block, the wedges, toggle members and the shoes are practical floating members inside the ring. By providing an odd number of arms for the body or core member as shown, a tripod effect is given to the toggle members, thus providing a floating center support at the block 20 which equalizes any difference there may be between the length of the elements comprising the shoe, the toggle members and the intermediate wedge. This insures an equal operation of all of the brake shoes.

The shoes do not normally conform to the inside radius of the ring; and separated points 27, 27' of contact with intermediate grease or oil chambers 28, 28' are thus provided between the shoe and the ring when the device is in a releasing position. This insures more perfect lubrication during operation and also insures a more positive grip between the brake shoe and the ring at the beginning of the retarding motion. When the shock absorber is rotated in a direction opposite to the releasing direction, rotation in this direction which tends to spread the toggles also tends to force the brake shoes into conformity with the ring. This provides for the final braking action, as much friction surface as the patented device provided, and the braking operation is started positively. It has been found by experience that the grip between the shoes and the ring is more positive when there is a small contact at the beginning of the operation, and as the toggle acts to flex the brake shoe into conformity with the ring the oil is readily squeezed out from between the ring and the brake shoe thus allowing the middle surface to practically contact to produce the requisite friction. This insures high friction efficiency between the brake shoe and the arm on that portion of the relative rotation where friction is desired and insures a proper lubrication between the parts on the release movement where no friction is required.

The brake shoes are preferably faced with some friction material, preferably aluminum, which wears faster than the frictional surface 12 of the ring. This prevents excessive wear of the ring at the ends of the shoe; and the shoe facing is easily replaceable when worn out. By making the shoe the resilient member the necessity of using the flat spring of the patented shock absorber is avoided. Said flat spring is more liable to break than the shoe and the resilient shoe is a cheaper construction. It is to be noted that in Fig. 1 the means to apply the force to the middle of any one of the shoes is arranged between the other two shoes. By using the coil spring 25 under the head of the adjusting bolt a constant adjustment is maintained by reason of the fact that when any wear does occur between the brake shoes and the ring the spring forces the adjusting bolt out and the adjusting bolt draws outward the adjusting block which is tapered.

In practical use the adjusting bolt is preferably screwed down until the coil spring 25 is fully compressed. This maintains a constant adjustment for a very long period. Since the frictional faces of the shoes are not in conformity with the ring and the toggle members act to deflect or spring them toward such conformity the oil or grease necessary to maintain proper lubrication is allowed to be squeezed out from between the friction faces as the braking action is required. The bolt hole 26 in the plate 10 is of larger diameter than the b l 24 and the adjusting block 20 is of less diameter than the chamber *f* that contains said block, so that the adjusting block, the intermediate wedges and the toggle members constitute floating means between the shoes and the rotary element 1 to force the shoes against the ring wall 2 and consequently the pressure is equalized between the shoes respectively.

In practical operation the spring 29 that resiliently separates the chassis and axle is allowed to be compressed freely upon the approach toward each other, of said chassis and axle, because the shoes slip freely in the direction that loosens the toggle members, but on the reverse movement the contact points under pressure from the springs 16 frictionally catch on the frictional surface 12 and thereby initiate the braking action which increases as the toggle members are swung toward radial position, thus springing the shoes toward conformity with the frictional surface and producing varying frictional resistance between the shoe and wall.

I claim:—

1. The combination with a circular ring wall of a resilient shoe having inside the wall a frictional surface that normally does not conform to the wall, and means operable to deflect the shoe toward conformity with said wall to produce frictional resistance between the shoe and the wall.

2. A shock absorber comprising relatively rotatable elements having frictional surfaces, the frictional surface of the external one of said elements being circular; and the other element being resilient; and normally unconfronted to the external frictional surface means to spring the resilient element outwardly from its normal shape to effect varying frictional engagement between said elements.

3. In a shock absorber the combination with a circular wall, of a shoe of greater radius than the wall, and means to apply force to the middle of the shoe to effect frictional action between said shoe and wall.

4. In a shock absorber the combination with a circular wall, of a shoe of different radius than the wall, and means to apply force to the middle of the shoe to effect frictional action between said shoe and wall.

5. In a shock absorber the combination with a circular wall, of an odd number of resilient shoes which do not conform to the wall, and floating means between said shoes to force said shoes into conformity with said wall.

6. In a shock absorber the combination with a circular wall, of an odd number of resilient shoes which do not conform to the wall, floating means between said shoes to force said shoes into conformity with said wall, and resilient means to hold said floating means in operative position.

7. The combination with two relatively rotatable elements, one of which has a circular wall; of shoes to engage said circular wall; said shoes being unconformed to the wall; floating means between said shoes and the second element to force the shoes against the wall upon relative rotation in one direction and to release the shoes upon relative rotation in the other direction and resilient means to hold said floating means in operative position.

8. The combination with two relatively rotatable members, one of which is provided with a circular wall, of floating shoes to frictionally engage said wall, floating shoe-operating means rotatable with the second member; an adjusting block between said shoe-operating means and the second member; an adjusting bolt for said adjusting block and a spring acting on the adjusting bolt to hold the adjusting block in adjusting position relative to the operative means.

9. The combination with two relatively rotatable members, one of which is provided with a circular wall; of floating shoes to frictionally engage said wall; floating shoe-operating means rotatable with the second member; and a floating block between said shoe-operating means and the second member; an adjusting bolt for said adjusting block and a spring acting on the adjusting bolt to hold the adjusting block in adjusting position relative to the operative means.

In testimony whereof, I have hereunto set my hand at Los Angeles, California, this 5th day of September, 1911.

GEO. CUSHING MARTIN.

In presence of—
JAMES R. TOWNSEND,
L. BELLE RICE.